Patented May 3, 1949

2,469,154

UNITED STATES PATENT OFFICE 2,469,154

PREPARATION OF ORGANO-SILICON COMPOSITIONS CONTAINING RAPIDLY POLYMERIZABLE OLEFINIC DOUBLE BONDS

Raymond H. Bunnell and David B. Hatcher, Toledo, Ohio, assignors to Libbey-Owens-Ford Glass Company, Toledo, Ohio, a corporation of Ohio No Drawing. Application April 30, 1948, Serial No. 24,436

16 Claims. (Cl. 260—46.5)

The invention relates to the preparation of novel organosilicon compositions containing rapidly polymerizable olefinic double bonds.

Among the most useful synthetic resins are those produced by addition polymerization of olefinic double bonds. The linkages formed in such addition polymerization consist of carbon chains, which are resistant to hydrolysis and impart stability and water-resistance to the resulting polymers.

The formation of a synthetic resin by addition polymerization is advantageous in that no volatiles are split off during such polymerization. In contrast, the formation of a synthetic resin by condensation is accompanied by the elimination of water or other volatiles. The evolution of volatiles in the formation of a synthetic resin by condensation prevents the synthetic resin from being formed as a casting or other solid body in which the volatiles might be trapped. Thus there are many important applications for which a synthetic resin that is formed by condensation cannot be used.

It has been found that olefinic double bonds in the organo-silicon compositions heretofore known are very difficult to polymerize. Thus, organo-silicon compositions containing vinyl or allyl radicals have been found to be polymerizable only very slowly, if at all, unless there is added another substance that is capable of copolymerization with such vinyl or allyl radicals.

Because of the difficulty of polymerizing olefinic double bonds in the organo-silicon compositions heretofore known, it has been possible to harden or convert such organo-silicon compositions to infusible resins only by condensation and not by addition polymerization of the olefinic double bonds.

The principal object of the invention is the preparation of organo-silicon compositions containing rapidly polymerizable olefinic double bonds. More specific objects and advantages are apparent from the description, which illustrates and discloses but is not intended to limit the scope of the invention.

It is known that vinyltrichlorosilane can be polymerized only very slowly and with great difficulty. The present invention is based upon the discovery that (vinylphenyl) silanes and products of their hydrolysis undergo rapid addition polymerization through their vinyl radicals.

Polymerizable organo-silicon compositions embodying the present invention are valuable because hardening or conversion of the compositions to infusible resins can be carried out by addition polymerization without evolution of volatiles.

In many cases, the thermal decomposition of a haloalkyltrihalosilane produces a silicon tetrahalide and an olefin. It has been discovered, however, that the pyrolysis of (haloethyl)-phenyltrihalosilanes gives substantial yields of vinylphenyltrihalosilanes.

A vinylphenyltrihalosilane is produced in the practice of the invention by pyrolysis of a silane whose molecule consists of a silicon atom to which are attached three halogens, each having an atomic weight less than 40, and one (haloethyl) phenyl radical in which the halogen substitutent has an atomic weight between 20 and 100, i. e., an alpha- or beta-chloro- or bromoethylphenyltrihalosilane. The three halo radicals attached to the silicon atom in the silane molecule may be chloro or fluoro, and may be the same or different. The haloethyl group may be attached to the phenyl radical in the ortho, meta or para position.

For the sake of economy, it is usually preferable that the three halogen radicals attached to the silicon atom in the (haloethyl)phenyltrihalosilane molecule be chloro radicals, and that the halogen substitutent on the ethyl radical be a chloro radical, although, in some instances, it may be desirable that this substituent be the more reactive bromo radical.

It is usually preferable that the haloethyl group be attached to the phenyl radical in the para position, although (haloethyl)phenyltrihalosilanes having the haloethyl group in the ortho or meta position also produce useful (vinylphenyl)-silanes.

Usually it is preferable to hydrolyze the vinylphenyltrihalosilanes, either alone or as one constituent of a silane mixture, and then to polymerize the resulting siloxane by addition polymerization through the vinyl groups. However, it is sometimes desirable to hydrolyze a silane composition comprising a vinylphenyltrihalosilane and simultaneously to polymerize the composition through the vinyl groups, or to polymerize, without hydrolysis, the vinyl groups of a vinylphenyltrihalosilane. A vinylphenyltrihalosilane can also be copolymerized with other materials containing olefinic double bonds, including such materials as styrene.

In instances where it is desirable to polymerize a composition comprising an unhydrolyzed silane of the invention the extreme reactivity of the chloro or fluoro radicals makes it likely that at least partial hydrolysis of the vinylphenyltrihalosilanes will occur during the handling incident to polymerization. Any such hydrolysis makes cross-linking possible and tends to form a thermosetting, or infusible resin rather than a thermoplastic, or fusible resin. It may sometimes be desirable to decrease the likelihood of such inadvertent hydrolysis. This can be accomplished by replacing the chloro or fluoro radicals in the vinylphenyltrihalosilane with other less readily hydrolyzable radicals. In a silane embodying the invention so produced, these less readily hydrolyzable radicals may be alkoxy, aroxy or acyloxy. The alkoxy radical is any primary or secondary alkoxy radical having from one to four carbon atoms (i.e., methoxy, ethoxy, propoxy, isopropoxy, n-butoxy, isobutoxy or secondary butoxy). The aroxy radicals are those in which the aryl group is phenyl, or a mono-, di- or tri-substituted phenyl radical, each substituent being a primary, secondary or tertiary alkyl radical having from one to five carbon atoms, the total number of carbon atoms in the side chains being not more than five (i. e., the aryl radical is phenyl, or ortho-, meta- or para-methyl phenyl, any di- or tri-methyl phenyl, or any substituted phenyl in which the substituents are: one ethyl; one ethyl and one methyl; two ethyls; two methyls and one ethyl; two ethyls and one methyl; either propyl radical; either propyl radical and methyl; either propyl radical and two methyls; either propyl radical and ethyl; any butyl radical; any butyl radical and methyl; or any pentyl radical). The acyloxy radical has the general formula

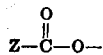

in which Z is a saturated straight, branched or closed chain hydrocarbon radical having from one to eighteen carbon atoms, or phenyl or substituted phenyl, the substituents, if any, consisting of from one to three alkyl radicals each having from one to five carbon atoms, and all having a total of not more than five carbon atoms, as hereinbefore described.

Silanes having alkoxy radicals as the hydrolyzable radicals are produced by reaction between silanes having hydrolyzable halo radicals and monohydric aliphatic alcohols, including methyl alcohol, ethyl alcohol, propyl alcohol, isopropyl alcohol, n-butyl alcohol, isobutyl alcohol and secondary butyl alcohol.

Silanes having hydrolyzable radicals which consist of acyloxy groups are produced by reaction between an acid anhydride and an appropriate silane having hydrolyzable radicals which consist of alkoxy groups, or, in some instances, by reaction between an appropriate silane having hydrolyzable halo radicals and the sodium salt of the organic acid.

Silanes embodying the invention having aroxy radicals attached to the silicon atom in the silane molecule are prepared by reaction between the corresponding halosilane and phenol, or a mono-alkyl-, dialkyl- or trialkyl-substituted phenol in which each alkyl substituent has from one to five carbon atoms, and all the alkyl substituents contain a total of not more than five carbon atoms as hereinbefore described.

When a silane is hydrolyzed the hydrolyzable radicals in the silane molecule are replaced by hydroxyl groups to form, at least as intermediates, silanols. Although in some instances it is possible to isolate silanols (e. g., diethylsilanediol or diphenylsilanediol) a condensation reaction between two silanol molecules (i. e., a reaction corresponding to the equation,

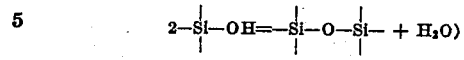

is usually understood to take place, at least to a small extent, concurrently with or immediately following hydrolysis. Unless it is desired to produce unhydrolyzed polymers, the hydrolyzable radicals are lost so that it is ordinarily preferable to produce and polymerize the less expensive vinylphenyltrihalosilanes rather than the alkoxy-, aroxy- or acyloxysilanes of the invention.

Alpha- and beta-chloro- or (bromo-ethyl)-phenyltrihalosilanes may be prepared by chlorination or bromination of the corresponding ethylphenyl compound, which may be obtained by means of a series of simple reactions starting from o-, m- or p-bromo ethylbenzene and a silicon tetrahalide. In order to demonstrate the method by which such an ethylphenyl compound is prepared, the following procedure is set forth: absolute diethyl ether (about 25 grams) is added to magnesium (60 grams) in a two liter, three-necked flask fitted with a sealed stirrer, a dropping funnel and a reflux condenser equipped with a calcium chloride drying tube. Ethyl bromide (5 ml.) is added to the flask to initiate a reaction between the magnesium and a halo-substituted hydrocarbon (i. e., to start Grignard reagent formation). This reaction is exothermic in nature, and dropwise addition of p-bromoethylbenzene (at a rate of about 1.2 mols per hour) is begun as soon as the reaction is proceeding well. Absolute diethyl ether (about 475 ml.) is added through the reflux condenser, and the mixture is stirred through the rest of the reaction. After the reaction has been conducted for from about 2½ to 3 hours (the p-bromoethylbenzene added to the flask amounts to 415 grams) the material is heated under gentle reflux for about three hours.

The resulting Grignard solution (comprising

is separated from the unreacted magnesium (e. g., by filtration or by decantation) and is added dropwise (at a rate of about 300 grams per hour) to a three liter, three-necked flask containing a stirred mixture of a silicon tetrahalide (595 grams of silicon tetrachloride) and absolute diethyl ether (800 ml.), and fitted with a sealed stirrer, a dropping funnel and a reflux condenser equipped with a calcium chloride drying tube. When the addition of the Grignard solution is complete (about three hours after the addition was started) the mixture is stirred under gentle reflux for about 4 hours. The resulting mixture is filtered through a Buchner funnel, and the filter cake is washed with absolute ether (about 50 ml.). The ether is removed from the filtrate by distillation, and the p-ethylphenyltrihalosilane (240 grams of p-ethylphenyltrichlorosilane) is separated from the residue by fractional distillation. The corresponding fluoro or mixed fluoro-chloro products are prepared by means of a corresponding reaction using silicon tetrafluoride or silicon tetrahalides in which the halogens are mixtures of fluoro and chloro radicals.

It is believed that the pyrolysis reaction of the invention proceeds by removal of hydrogen chloride or hydrogen bromide from the chloroethyl or bromoethyl side chain of a (haloethyl)phenyltrihalosilane, so that the haloethyl radical is converted to a vinyl group. This pyrolysis, or dehydrohalogenation, is accomplished merely by subjecting the (haloethyl)phenyltrihalosilane, or mixture of (haloethyl)phenyltrihalosilanes to an elevated temperature, excluding moisture, or any other material that will react with such silanes. The (haloethyl)phenyltrihalosilane can be subjected to an elevated temperature simply by dripping the liquid silane into a heated reaction zone, or it can be vaporized in suitable equipment and then conducted to a heated reaction zone. When the latter procedure is used an inert gas may be passed through the equipment to serve as a carrier for the silanes, but this is not essential. Before pyrolysis is started it is desirable that the equipment be flushed with a heated inert gas to remove any substances with which a silane would react. The vinylphenyltrihalosilanes produced in the practice of the invention are high boiling materials (e. g., p-vinylphenyltrichlorosilane boils at 102–103° C. at an absolute pressure of 8 mm. of mercury); therefore, a single water-cooled condenser is sufficient to condense all the product from an ordinary laboratory scale preparation. The hydrogen halide produced by the pyrolysis can be collected in a water scrubber which follows the condenser. A pure vinylphenyltrihalosilane is obtained by fractional distillation (through a packed column) of the liquid collected in the condenser.

The minimum temperature at which it is practical to conduct the reaction of the invention is dependent to some extent upon whether a (chloroethyl)phenyltrihalosilane or a (bromoethyl)phenyltrihalosilane is pyrolyzed, but pyrolysis usually occurs at temperatures as low as about 200° C., although complete dehydrohalogenation does not result from the reaction at such a temperature. It is usually preferable to conduct the pyrolysis at temperatures not lower than about 250° C. and most desirable that the reaction be conducted at temperatures not lower than about 300° C. The maximum temperature at which it is practical to conduct the reaction of the invention is a temperature above which undesired decomposition occurs, above which increased heat input is not useful because it does not produce larger yields of vinylphenyltrihalosilanes, or above which undue polymerization of the vinylphenyltrihalosilanes occurs. In most instances it is not practical to conduct the reaction of the invention at temperatures higher than about 500° C., and it is preferable that the reaction not be conducted at temperatures higher than about 450° C. Most desirably the reaction is not conducted at temperatures higher than about 400° C.

Conducting the present reaction at elevated pressure may tend to reduce the yield. Consequently, the less expensive method of conducting the reaction at approximately atmospheric pressure is adopted.

The pyrolysis can be conducted simply by dripping the liquid silane into a heated reaction zone. Pyrolysis occurs readily at the temperatures indicated above, and the resulting vinylphenyltrihalosilanes are vaporized and can be condensed in a water-cooled condenser attached to the reactor where pyrolysis occurs. When the reaction is conducted in this way the silane should be added to the reactor at a rate sufficiently slow that liquid does not collect in the reactor, as large quantities of liquid (haloethyl)phenyltrihalosilanes are likely to pyrolyze and polymerize if subjected to an elevated temperature for an extended period of time. Thus, the rate at which the (haloethyl)phenyltrihalosilane is added to the reactor may depend upon the temperature at which the pyrolysis is conducted, a slower rate of addition being used with a lower reaction temperature, and a faster rate when the reactor is maintained at a higher temperature.

The (haloethyl)phenyltrihalosilane can also be vaporized in the presence of an inert gas which serves as a carrier for the silane, and the mixture of inert gas and (haloethyl)phenyltrihalosilane can be conducted to the reactor. When this method is adopted the silane should be added dropwise to the vaporizer so that there is not an accumulation of large quantities of the liquid silane at the elevated temperature of the vaporizer. The boiling temperature of the (haloethyl)phenyltrihalosilanes is higher than the minimum temperature at which pyrolysis occurs so that collection of a considerable quantity of the liquid silanes in the vaporizer should be avoided in order to minimize the possibility of pyrolysis and polymerization in the vaporizer. The presence of the inert gas carrier is advantageous because it serves as a diluent and decreases the tendency toward premature addition polymerization. Nitrogen, hydrogen, helium, neon, argon or krypton can be used as the inert gas carrier and diluent, although, in some instances, hydrogen may be undesirable because of a tendency to hydrogenate the vinylphenyltrihalosilane.

The pyrolysis reaction proceeds at a relatively rapid rate so that comparatively large amounts of vinylphenyltrihalosilanes can be produced by continuous operation of small equipment. There is usually no practical reason for using a contact time of more than about two minutes. ("Contact time" is used herein to mean the average time for a quantity of reactant equal to the volume of the reaction zone, calculated at reaction temperature and pressure, to pass into the reactor.) Usually it is preferable to use contact times not longer than about one minute, and most desirable to use contact times not longer than about thirty seconds in the practice of the invention. It is ordinarily desirable to use contact times not shorter than about one second, although in some instances it is possible to use contact times as low as about ¼ second. It is usually preferable to use contact times not shorter than about two seconds. Most desirably the reaction of the invention is conducted using contact times not shorter than about five seconds.

The (vinylphenyl)silanes of the invention are highly useful compounds which can be polymerized (or copolymerized) through the olefinic double bonds of the vinyl groups and then hydrolyzed (or cohydrolyzed) to form compositions which can be condensed to useful siloxanes. The (vinylphenyl)silanes of the invention can also be polymerized (or copolymerized) and hydrolyzed (or cohydrolyzed) simultaneously to form useful compositions, or they can be hydrolyzed (or cohydrolyzed) and condensed to siloxane compositions containing olefinic double bonds which are capable of rapid addition polymerization.

It has been found that the (vinylphenyl)silanes of the invention are highly polymerizable. A sample of one of these silanes is polymerized by the action of heat, polymerization proceeding even at room temperature; it is usually desirable to add to the silane to be polymerized a small amount of a peroxide polymerization catalyst so that the polymerization proceeds readily at a relatively low temperature.

It has been found that the polymerization proceeds readily at temperatures as low as about 50° C., although it is usually desirable to conduct the polymerization at temperatures not lower than about 60° C. It is usually not advantageous to polymerize the silanes of the invention at temperatures higher than about 90° C., and it is ordinarily preferable to polymerize these silanes at temperatures not higher than about 80° C.

The rate of the addition polymerization is faster in the presence of peroxide type polymerization catalysts. Peroxide type polymerization catalysts include benzoyl peroxide, succinyl peroxide, tert-butyl perbenzoate, di-tert-butyl perphthalate, acetyl peroxide, peracetic acid, perbenzoic acid, toluoyl peroxide, p-bromobenzoyl peroxide, anisoyl peroxide, chloroacetyl peroxide, acetyl benzoyl peroxide, diacetyl peroxide, and furoyl peroxide. Certain organic ozonides also increase the rate at which addition polymerization of olefinic double bonds takes place; examples of organic ozonide polymerization catalysts include di-isopropyl ozonide and di-isobutylene ozonide.

Although any amount of a catalyst sufficient to cause the polymerization to proceed at a reasonable rate can be used in carrying out the polymerization reaction, the usual "catalytic amounts" are normally employed. For example, it is ordinarily advantageous to use an amount of a polymerization catalyst that is at least about 0.05 per cent of the composition to be polymerized. (The terms "per cent" and "parts," as used herein to refer to quantities of material, mean per cent and parts by weight unless otherwise qualified.) It is usually preferable that the amount of catalyst used be at least about 0.1 per cent of the composition to be polymerized. Ordinarily, it is advisable that the amount of catalyst used be not more than about 5 per cent of the composition to be polymerized, and most desirable that the amount of catalyst be not more than about 3 per cent.

The polymerization can be conducted to any desired extent, as the composition goes through well defined polymerization stages, becoming first a viscous syrup, next a soft, rubbery resin, and finally a hard, brittle resin. In most instances the hard resin stage is reached within about sixteen hours when the polymerization is conducted at a temperature of 70° C., and the soft, rubbery stage is reached within about two hours when the polymerization is conducted at 70° C. The length of time that the polymerization is conducted depends upon the extent of polymerization desired, upon the temperature at which the polymerization is conducted, and upon the amount and effectiveness of the polymerization catalyst used.

As hereinbefore described, addition polymerization alone should produce thermoplastic resins from the silanes of the invention. However, it has been found that in some instances the polymerized compositions are not thermoplastic. This is thought to be because partial hydrolysis and condensation through Si—O—Si bonds, in addition to the polymerization, has resulted in cross-linked molecules, and is thought to be avoidable by polymerization of silanes of the invention having, attached to the silicon atom in the silane molecule, three hydrolyzable radicals that are comparatively difficult to hydrolyze.

It is sometimes desirable to copolymerize the silanes of the invention with other materials containing polymerizable olefinic double bonds. These silanes undergo addition polymerization in much the same way that styrene undergoes addition polymerization, and they copolymerize readily with styrene and with compounds that copolymerize with styrene. Examples of compounds that copolymerize with styrene include methyl methacrylate, acrylonitrile, butadiene, vinylidene chloride, and esters of such acids as maleic, acrylic and itaconic with allyl, methallyl, 1-chloro-2-propyl, 2-chloroethyl, benzyl, tetrahydrofurfuryl, cyclohexyl, phenyl, o-cresyl, m-cresyl, p-cresyl, methyl, ethyl, propyl, isopropyl, n-butyl, isobutyl or secondary butyl alcohol, or a primary or secondary monohydric alcohol having from five to eight carbon atoms.

When the silanes of the invention are copolymerized it is usually desirable that the polymerization be conducted at a temperature somewhat lower than that used when the silanes are polymerized alone, because most of the materials that can be copolymerized with these silanes are lower boiling materials than are the silanes themselves. It is usually desirable to conduct the copolymerization in the presence of one of the specified polymerization catalysts in an amount hereinbefore set forth so that the copolymerization can be conducted at a comparatively low temperature. It is usually not desirable that the copolymerization be conducted at a temperature higher than about 85° C., and it is ordinarily preferable to use a temperature not higher than about 75° C. Although copolymerization proceeds at room temperature (i. e., about 25° C.) it is usually desirable that the copolymerization be conducted at a temperature of at least about 35° C., and ordinarily preferable that it be conducted at a temperature of at least about 45° C.

The copolymerization is allowed to proceed for a time sufficient to accomplish the degree of polymerization desired. This time is usually at least about 12 hours at the comparatively low temperatures used for copolymerization and may be as long as about 70 hours, although the material is usually gelled in somewhat less than 70 hours.

Thermoplastic compositions are normally produced by such copolymerization unless the material copolymerized with the silanes of the invention is di- or tri-functional (i. e., has two or three polymerizable double bonds). Infusible copolymers are sometimes obtained even though the materials polymerized are all mono-functional. This can be avoided by copolymerizing silanes of the invention having, attached to the silicon atom in the silane molecule, three hydrolyzable radicals that are comparatively difficult to hydrolyze.

The silanes of the invention can also be hydrolyzed to form useful compositions. Since the silanes of the invention have three hydrolyzable radicals attached to the silicon atom in the silane molecule, hydrolysis of these silanes produces (at least as an intermediate) silanols, each molecule of which can condense with three other silanol molecules to form siloxanes. Thus, highly cross-linked siloxanes result from hydrolysis of silanes of the invention alone, and it is usually desirable to cohydrolyze the silanes of the invention with other silanes having fewer hydrolyzable radicals attached to each silicon atom in the silane molecule so that the $r/Si$ ratio is not greater than about 2.5. ("$r/Si$ ratio" is used herein to mean the total number of nonhydrolyzable radicals attached to silicon atoms in a silane composition divided by the total number of silicon atoms in the composition.) It is desirable that it be not less than about 1, and usually preferable that it be not less than about 1.5.

It is possible to conduct the hydrolysis reaction simply by adding a silane or mixture of silanes to water or, in the case of silanes which are less readily hydrolyzed, to a hydrolyzing solution of an inorganic acid in water. The hydrolyzing solution can also be a water solution of a base. Usually at least partial condensation (i. e., to a siloxane structure comprising Si—O—Si bonds) accompanies or follows immediately the hydrolysis. However, it has been found possible to conduct the hydrolysis reaction so that complete condensation does not follow immediately the hydrolysis reaction, with the result that liquid, hydrolyzed and only partially condensed silanes can be isolated after the hydrolysis reaction.

Silanes that can be cohydrolyzed with the vinylphenyltrihalosilanes in the practice of the invention include ethyltrifluoro-, or chloro- or methoxy- or ethoxy- or proproxy- or n-butoxy- or isopropoxy-, diethyldiethoxy- or fluoro- or chloro-, diethylchloroethoxy-, ethylchlorodiethoxy-, cyclohexyltrichloro-, cyclohexylmethyldichloro-, trimethylcyclohexyltrichloro-, p-tertiaryamylcyclohexyltrichloro-, methyltrifluoro- or chloro- or bromo-, dimethyldifluoro- or chloro- or bromo-, trimethylfluoro- or chloro- or bromo-, n-propyltrifluoro- or chloro-, di-n-propyldichloro-, tri-n-propylfluoro- or bromo-, isopropyltrifluoro-, n-butyltrifluoro- or chloro-, di-n-butyldifluoro-, tri-n-butylfluoro-, isobutyltrichloro-, tri - isobutyl- bromo-, n-pentyltrifluoro- or chloro-, di-n-pentyldifluoro-, tri-n-pentylfluoro-, methylchlorodifluoro-, methylfluorodichloro-, dimethylfluorochloro-, n-propylchlorodifluoro-, n-propylfluorodichloro-, isopropylchlorodifluoro-, isopropylfluorodichloro-, n-butylchlorodifluoro-, n-butylfluorodichloro-, isopentyltrichloro-, tri-isopentylbromo-, methyltriethoxy- or n-butoxy-, dimethyldiethoxy- or n-butoxy-, dimethylchloro-n-butoxy, trimethylmethoxy- or ethoxy- or n-butoxy-, n-propyltriethoxy-, isopropyltriethoxy-, n-butyltriethoxy-, isobutylchloromethoxyethoxy- and isopentyltriethoxy- silanes and the like.

It is also possible (e. g., by adding a polymerization catalyst to a silane of the invention, to a mixture of silanes of the invention, or to a mixture of one or more silanes of the invention and another substance or mixture of substances with which such silanes can be copolymerized, as hereinbefore described) to hydrolyze or cohydrolyze silanes of the invention so that polymerization and hydrolysis occur simultaneously.

The hydrolyzed compositions of the invention that have not been polymerized comprise units having the general formula

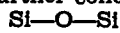

in which R is a vinylphenyl radical. The vinyl groups in such a composition can be subjected to addition polymerization in order to produce polymeric compositions derived in part from condensation polymerization through Si—O—Si bonds and in part from addition polymerization through the vinyl groups. It is usually desirable that such polymerization be conducted in the presence of one of the polymerization catalysts hereinbefore described. The amount of a polymerization catalyst that is used is based upon the weight of the (vinylphenyl) silanes hydrolyzed or cohydrolyzed. It is employed in the usual catalytic amounts, as hereinbefore described.

The temperature at which the polymerization of these vinyl groups is conducted depends upon the molecular structure of the siloxanes of which the vinyl groups form a part. The vinyl groups undergo reasonably rapid addition polymerization at temperatures as low as about 50° C., although it is usually desirable to conduct the polymerization at temperatures not lower than about 60° C. If the siloxanes to which the vinyl groups are attached have been condensed completely prior to polymerization of the vinyl groups this polymerization is the only reaction that occurs, and, ordinarily, it is not advantageous to conduct such polymerization at temperatures higher than about 90° C. It is usually preferable to conduct such polymerization at temperatures not higher than about 80° C. However, such units may be present in siloxanes that are only partially condensed. When this is true it is usually desirable that both addition polymerization through the vinyl groups and further condensation to Si—O—Si bonds be conducted simultaneously. Although the vinyl groups of such a composition can be polymerized at temperatures within the ranges set forth above, complete condensation of the siloxane type (i. e., through formation of Si—O—Si bonds) does not occur at such temperatures within a reasonable period of time. When it is desired simultaneously to accomplish the addition polymerization and the condensation, the material should ordinarily be subjected to a temperature of at least about 140° C., and it is usually preferable that the material be subjected to a temperature of at least about 160° C. Usually it is not desirable to subject the material to a temperature higher than about 200° C., and it is ordinarily preferable not to subject the material to a temperature higher than about 180° C. It is possible to polymerize the partially condensed siloxane compositions of the invention at temperatures within the lower range hereinbefore set forth, and then to subject the resulting material to a higher temperature (i. e., one within the higher range) in order to complete the condensation. In some instances such a procedure may be preferred to produce a resin for a special purpose.

*Example 1*

A sample of a p-ethylphenyltrihalosilane (100 grams of p-ethylphenyltrichlorosilane) is placed in a 500 ml., three-necked flask fitted with a dropping funnel, a sealed stirrer and a reflux condenser equipped with a tube which provides a means for removal of hydrogen halide vapors (e. g., leads to a hood). The flask is illuminated with ultra-violet light (e. g., from a high pressure mercury vapor lamp equipped with a filter which absorbs all radiation having a wave length shorter than 2800 Angstrom units, 60 per cent of the radiation having a wave length shorter than 3400 Angstrom units and 10 per cent of the radiation having a wave length shorter than 4400 Angstrom units; such a lamp is the "Mazda CH-4" 100 watt ultra-violet lamp) and a halogen (bromine) is added to the flask at a rate of about 2/3 mol per hour. The resulting (haloethyl) phenyltrihalosilane (after the reaction has been allowed to proceed for about 45 minutes and the bromine added amounts to 60 grams) is not separated but is subjected to pyrolysis to yield a vinylphenyltrihalosilane of the invention according to the following procedure:

The material produced by the procedure of the preceding paragraph is placed in a separatory funnel fitted into the straight arm of a 250 ml. Claisen flask which has a thermometer in the second arm and is equipped with a water-cooled horizontal condenser. The flask is heated to a temperature between about 400° C. and about 500° C. Dropwise addition of the material in the separatory funnel is begun (at a rate of about 250 grams per hour). The material condensed in the horizontal condenser is collected in a receiver, about 100 grams being collected during the course of the 30 minute reaction. This material (a dark colored liquid) is placed in a 250 ml. Claisen flask and separated by distillation into two fractions. For convenience these fractions are hereinafter called sample I (55 grams of a material whose boiling range is from about 115° C. to about 130° C. at an absolute pressure of 17 mm. of mercury) and sample II (38 grams of a material having a boiling range from about 130° C. to about 155° C. at an absolute pressure of 17 mm. of mercury). By adding bromine to sample I and to sample II it is determined that each comprises material having ethylenic-type unsaturation.

Example 2

Two mixtures of silanes are prepared and hydrolyzed in order to compare the characteristics of sample I with the characteristics of phenyltrichlorosilane. The procedure used is as follows: Diethyldichlorosilane (12.6 grams) and ethyltrichlorosilane (7.4 grams) are mixed and phenyltrichlorosilane (12.6 grams) is added to the mixture. This mixture of silanes is dissolved in diethyl ether (about 100 ml.), and the solution is poured over cracked ice (about 50 grams). This hydrolysis mixture is stirred for about ten minutes, and the ether layer is separated from the water (e. g., in a separatory funnel), washed twice with water (about 25 cc. portions) and dried over anhydrous sodium sulfate (about 15 grams). The ether is evaporated by heating the dried solution on a steam bath until the temperature of the liquid rises a few degrees above the boiling temperature of the ether. The resulting viscous syrup is hereinafter called sample A. Sample B is prepared by a procedure that is the same as that used to prepare sample A except that sample I (14.4 grams) is used instead of the phenyltrichlorosilane.

Two per cent of benzoyl peroxide is added to each of samples A and B which are then heated at about 75° C. on a steam bath for about twenty minutes. Sample B is a comparatively hard gel, tacky on the surface, at the end of this heating; whereas sample A is apparently unaffected by this treatment. Samples A and B are then heated in an electric oven at 75° C. for about 64 hours. Sample B is a clear, hard, light brown resin which is uniformly hard throughout. Sample A is somewhat more viscous than before this heating, but shows no sign of gelation.

The procedure of the first paragraph of the example is repeated to prepare another portion of sample B. This portion is heated in an electric oven to 130 C. for about one hour. The resin, after this heating, is somewhat more viscous but is not gelled; it is cooled; and 2 per cent of benzoyl peroxide is added. The resin is then heated on a steam bath at about 75° C. for five minutes, after which time it is a rubbery gel. This gel is hardened by heating in an electric oven at 130° C. for about two hours.

Example 3

A sample of a p-ethylphenyltrihalosilane (476 grams of p-ethylphenyltrichlorosilane) is placed in a glass tube about 24 inches long, having an internal diameter of about 1⅝ inches (supported in a vertical position) fitted (at the bottom of the tube) with a gas inlet and (at the top of the tube) with a reflux condenser attached (by a glass tube) to a water scrubber used to remove hydrogen halides formed by the halogenation reaction. The scrubber is arranged so that water which has absorbed a hydrogen halide drips into a flask containing about one liter of two normal potassium hydroxide and methyl orange indicator. The tube containing the p-ethylphenyltrihalosilane is illuminated with ultra-violet light (e. g. from a lamp as described in the first paragraph of Example 1) and chlorine is admitted into this tube until the methyl orange turns red (fresh methyl orange is added as the chlorine bleaches that in the flask). The chlorinated material is separated by fractional distillation through an 18 inch glass column, 18 mm. in diameter, packed with glass helices to produce 128 grams of p-(chloroethyl)phenyltrichlorosilanes (boiling point 126–127° C. at an absolute pressure of 7 mm. of mercury).

The p-(chloroethyl)trihalosilane composition produced by the procedure of the preceding paragraph is subjected to pyrolysis by a procedure that is the same as that described in the second paragraph of Example 1. The pyrolyzed vapor distills from the Claisen flask at a vapor temperature between about 238° C. and about 240° C., and is condensed to yield 85 grams of a brown liquid. A p-vinylphenyltrihalosilane (50 grams of p-vinylphenyltrichlorosilane, boiling temperature 102–103° C. at an absolute pressure of 8 mm. of mercury) is obtained by fractional distillation of this liquid through an 18 inch glass column, 18 mm. in diameter, packed with glass helices. A viscous residue (33 grams) remains in the distillation flask.

Example 4

A (vinylphenyl)silane is polymerized by the following procedure:

A sample of a (vinylphenyl)silane (5 grams of p-vinylphenyltrichlorosilane) is mixed with benzoyl peroxide (0.05 gram), and the mixture is placed in a small vial which is stoppered and heated in an electric oven at about 70° C. After two hours at this temperature a clear, soft, rubbery resin is produced. This rubbery resin is converted to a clear, hard, brittle resin by further heating at about 70° C. for an additional fourteen hours. This brittle resin becomes rubbery when heated to about 120° C. but does not melt.

Example 5

A p-(vinylphenyl)silane is copolymerized by the following procedure:

A sample of a p-(vinylphenyl)silane (5 grams of p-vinylphenyltrichlorosilane) is mixed with a composition containing readily polymerizable olefinic double bonds (95 grams of styrene), and benzoyl peroxide (0.50 grams) is added. A small portion (about 5 grams) of this mixture is placed in a test tube which is stoppered and heated in an electric oven at 70° C. for about 64 hours. This material is a solid about sixteen hours after heating is started and, when heating is discontinued, is a very hard, tough material bonded to the glass so well that the glass can be broken is transparent and has a slightly milky appearance. A sample becomes rubbery but does not melt on a hot plate at about 140° C. The material swells after refluxing for several hours in benzene, but does not dissolve. The remainder of the sample is polymerized by heating in a stoppered flask in an electric oven at 40° C. for about 136 hours. The sample solidifies after about 48 hours and has the same characteristics as the sample cured at 70° C.

The procedure of the preceding paragraph is repeated using 97.5 grams of styrene, 2.5 grams of p-vinylphenyltrichlorosilane and 0.5 gram of benzoyl peroxide. The mixture solidifies after about sixteen hours at 70° C. and about 48 hours at 40° C., and the resulting resins have the characteristics described for the resins produced by the procedure of the preceding paragraph.

*Example 6*

A (vinylphenyl)silane is cohydrolyzed according to the following procedure:

A (vinylphenyl)silane (2.8 grams of vinylphenyltrichlorosilane) is mixed with a hydrolyzable silane composition (15.6 grams of diethyldichlorosilane and 22.6 grams of ethyltrichlorosilane), and this mixture is dissolved in isopropyl ether (100 ml.). The resulting solution is poured over cracked ice (about 100 grams) and stirred for about five minutes. The ether layer is separated from the water (e. g., in a separatory funnel), washed twice with water (about 25 cc. portions), and dried over anhydrous calcium chloride (about 20 grams). The ether is evaporated by heating the dried solution on a steam bath until the temperature of the liquid rises a few degrees above the boiling temperature of the ether. The resulting clear, colorless syrup is hereinafter called sample C. Sample D is prepared by a procedure that is the same as that used to prepare sample C except that 6.0 grams of p-vinylphenyltrichlorosilane, and 20.5 grams of ethyltrichlorosilane are used.

Two per cent of benzoyl peroxide is added to 5 gram portions of samples C and D; these portions are then heated in small beakers on a steam bath at about 80° C. Each portion forms a soft gel after forty minutes; with additional heating for three hours at about 80° C. the gels become rubbery.

The remainders of samples C and D are diluted to about 70 per cent solids with toluene. Films of the toluene solutions on glass plates are cured by heating in an eleceric oven for about forty minutes at 200° C. The film from resin C is comparatively flexible while that from resin D is slightly brittle.

If the procedure of the preceding paragraph is repeated using, as the silane composition, 23.4 grams of diethyldichlorosilane, 32.8 grams of ethyltrichlorosilane and 21.8 grams of cyclohexyltrichlorosilane, and mixing with this composition 16.9 grams of a sample of p-vinylphenyltrichlorosilane that has been standing at room temperature for several days, a gel forms immediately when the ether solution is poured over the cracked ice.

Having described the invention, we claim:

1. A method of producing vinylphenyltrihalosilanes that comprises pyrolyzing a silane whose molecule consists of a silicon atom to which are attached three halogens, each having an atomic weight less than 40, and one (haloethyl)phenyl radical in which the halogen substituent has an atomic weight between 20 and 100.

2. A method of producing vinylphenyltrichlorosilanes that comprises pyrolyzing a silane whose molecule consists of a silicon atom to which are attached three chloro radicals and one (haloethyl)phenyl radical in which the halogen substituent has an atomic weight between 20 and 100.

3. A method of producing vinylphenyltrichlorosilanes that comprises pyrolyzing a (chloroethyl)phenyltrichlorosilane.

4. A method of producing p-vinylphenyltrichlorosilane that comprises pyrolyzing a p-(chloroethyl)penyltrichlorosilane.

5. A silane having the general formula

in which R is a vinylphenyl radical and each of the radicals Y, Y' and Y'' is a hydrolyzable radical.

6. A silane as claimed in claim 5 in which each hydrolyzable radical is a halogen having an atomic weight less than 40.

7. A vinylphenyltrichlorosilane.

8. p-Vinylphenyltrichlorosilane.

9. A product of the polymerization of a composition comprising a silane claimed in claim 5.

10. A product of the polymerization of a composition comprising a silane claimed in claim 5 in which each hydrolyzable radical is a halogen having an atomic weight less than 40.

11. A product of the polymerization of a composition comprising a vinylphenyltrichlorosilane.

12. A product of the hydrolysis of a composition comprising a silane claimed in claim 5.

13. A product of the hydrolysis of a composition comprising a vinylphenyltrichlorosilane.

14. A product of the hydrolysis and polymerization of a composition comprising a silane claimed in claim 5.

15. A product of the hydrolysis and polymerization of a composition comprising a vinylphenyltrichlorosilane.

16. The product of the polymerization of a composition comprising, as the only polymerizable substance, a silane claimed in claim 5.

RAYMOND H. BUNNELL.
DAVID B. HATCHER.

No references cited.